Dec. 23, 1969     MASATO TSUTSUMI ET AL     3,485,277
PINEAPPLE SLICING MACHINE
Filed April 11, 1967                          5 Sheets-Sheet 3

MASATO TSUTSUMI
WILLIAM W. WILMORE
INVENTORS.

BY Lyon & Lyon
ATTORNEYS

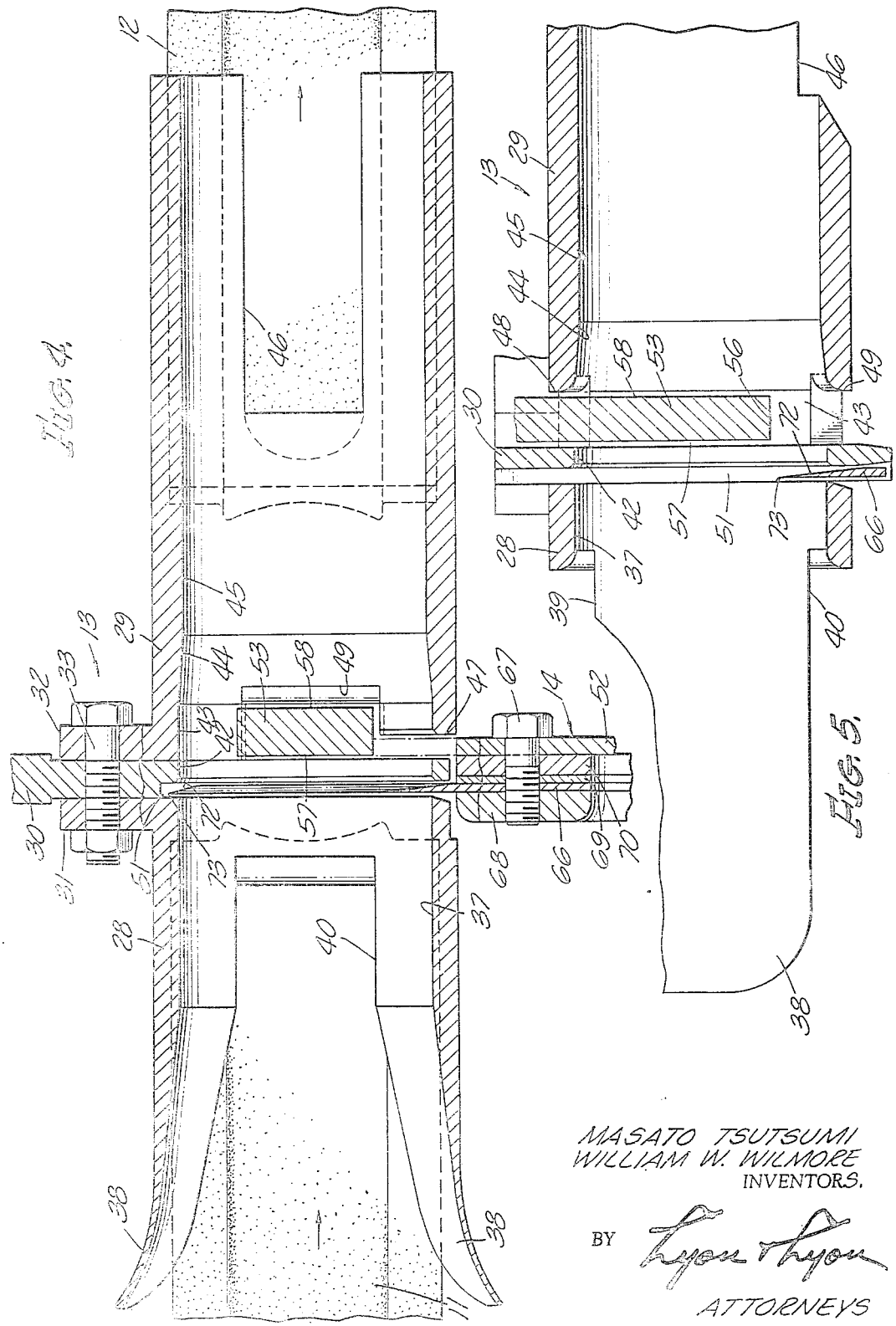

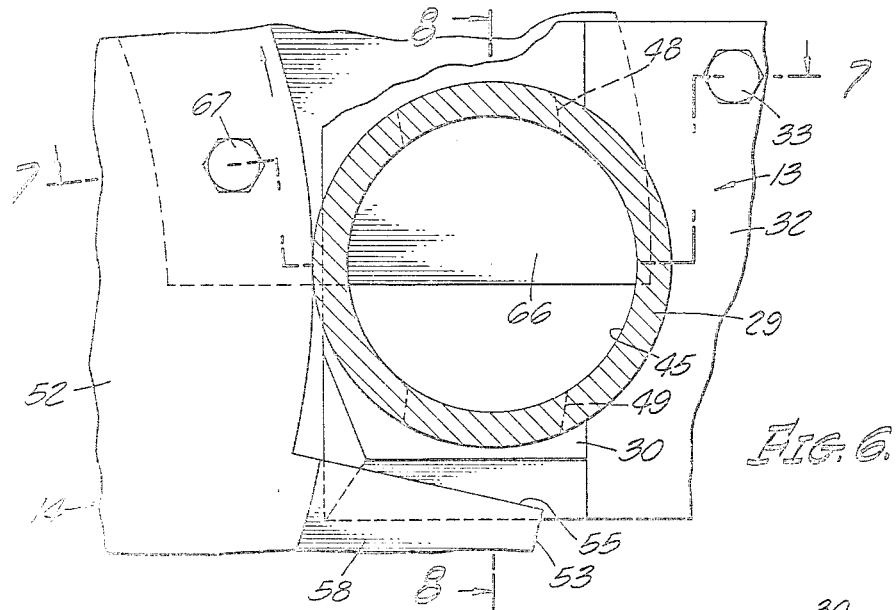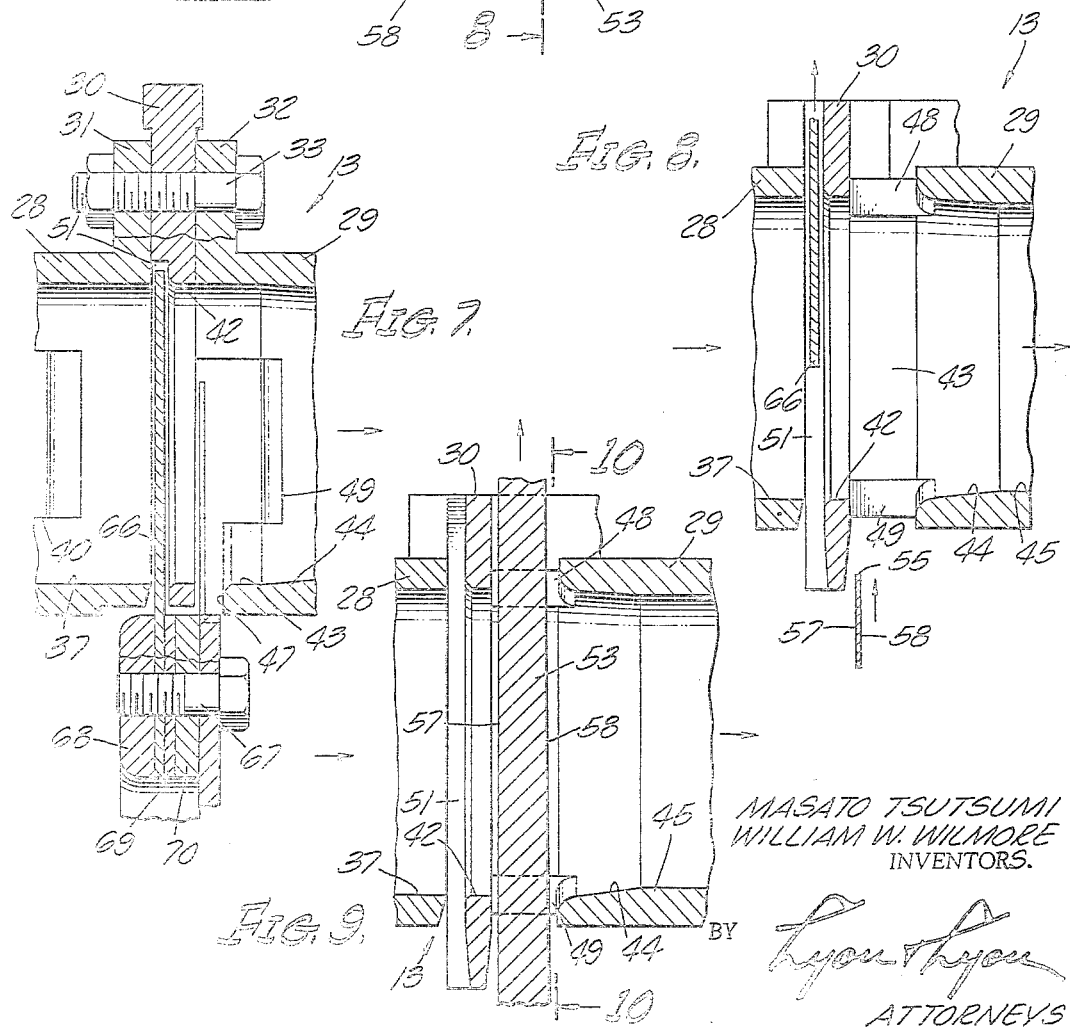

United States Patent Office  3,485,277
Patented Dec. 23, 1969

3,485,277
PINEAPPLE SLICING MACHINE
Masato Tsutsumi, Kahului, Maui, and William W. Wilmore, Haliimaile, Maui, Hawaii, assignors to Maui Pineapple Company, Ltd., Kahului, Maui, Hawaii, a corporation of Hawaii
Filed Apr. 11, 1967, Ser. No. 629,988
Int. Cl. A47j *17/14;* B26d *4/24*
U.S. Cl. 146—6                                                17 Claims

ABSTRACT OF THE DISCLOSURE

A rotary knife assembly cuts single slices from sized pineapple cylinders. The assembly includes a rotary gage plate having a plane surface contacted by the end of a sized pineapple cylinder. The gage plate surface is interrupted to provide an arcuate gap and the slicer knife is located adjacent the gap but laterally offset from the gage plate surface. The back side of the gage plate comprises a cam surface for lateral ejection of a cut slice. The fruit is fully supported at the time of slicing contact by the knife.

BACKGROUND OF THE INVENTION

This invention relates to slicing apparatus and is particularly directed to apparatus for slicing fresh pineapples after they have passed through a conventional Ginaca machine to trim off the top and bottom and to remove the outer shell to form a "sized cylinder." Conventional slicing apparatus for sized pineapple cylinders employs gangs of knives so that many slices are produced at one time, often with damage to the fruit. The slices emerge from the slicing machine on a conveyor belt, each slice being tilted with respect to its neighbor. The slice thickness cannot readily be changed because of the use of gang knives. The knife assembly of the present invention cuts only one slice at a time, with less damage to the fruit and insures uniform thickness of the slices, which slices emerge on a conveyor belt in groups corresponding in length to the sized pineapple cylinders fed into the slicing machine. The slices stand erect and are not tilted or slanted. This facilitates inspection and sorting. The single knife slicer permits minute variations to be made in slice thickness in order to meet drained weight requirements. Operation of can loading machines is facilitated because the slices are of uniform thickness. This device may be classified as a rotary knife, end cutter.

SUMMARY

Briefly stated, this invention concerns a single knife slicing apparatus for sized pineapple cylinders. At the instant a slice is to be made by the knife, the forward end of the cylinder abuts a rotating gage plate and the fruit cylinder is firmly supported in aligned cylindrical bores on both of a slot through which the knife blade passes. The slices are of uniform thickness, and the slicer housing is changed when fruit cylinders of a different diameter are to be sliced.

BRIEF DESCRIPTION OF THE DRAWINGS

FIGURE 4 is a sectional plan view taken substantially on the lines 4—4 as shown in FIGURE 3.
FIGURE 5 is a sectional side elevation taken substantially on the lines 5—5 as shown in FIGURE 3.

FIGURE 6 shows a portion of FIGURE 3 on an enlarged scale and showing the rotary parts moved to a different position with respect to the stationary parts.
FIGURE 7 is a sectional plan view taken substantially on the lines 7—7 as shown in FIGURE 6.
FIGURE 8 is a sectional side elevation taken substantially on the lines 8—8 as shown in FIGURE 6.
FIGURE 9 is a view similar to FIGURE 8 showing the rotary parts moved to a different position with respect to the stationary parts.
FIGURE 11 is a perspective view showing the rotary gage plate and the knife.

DESCRIPTION OF THE PREFERRED EMBODIMENT

Figure 1:
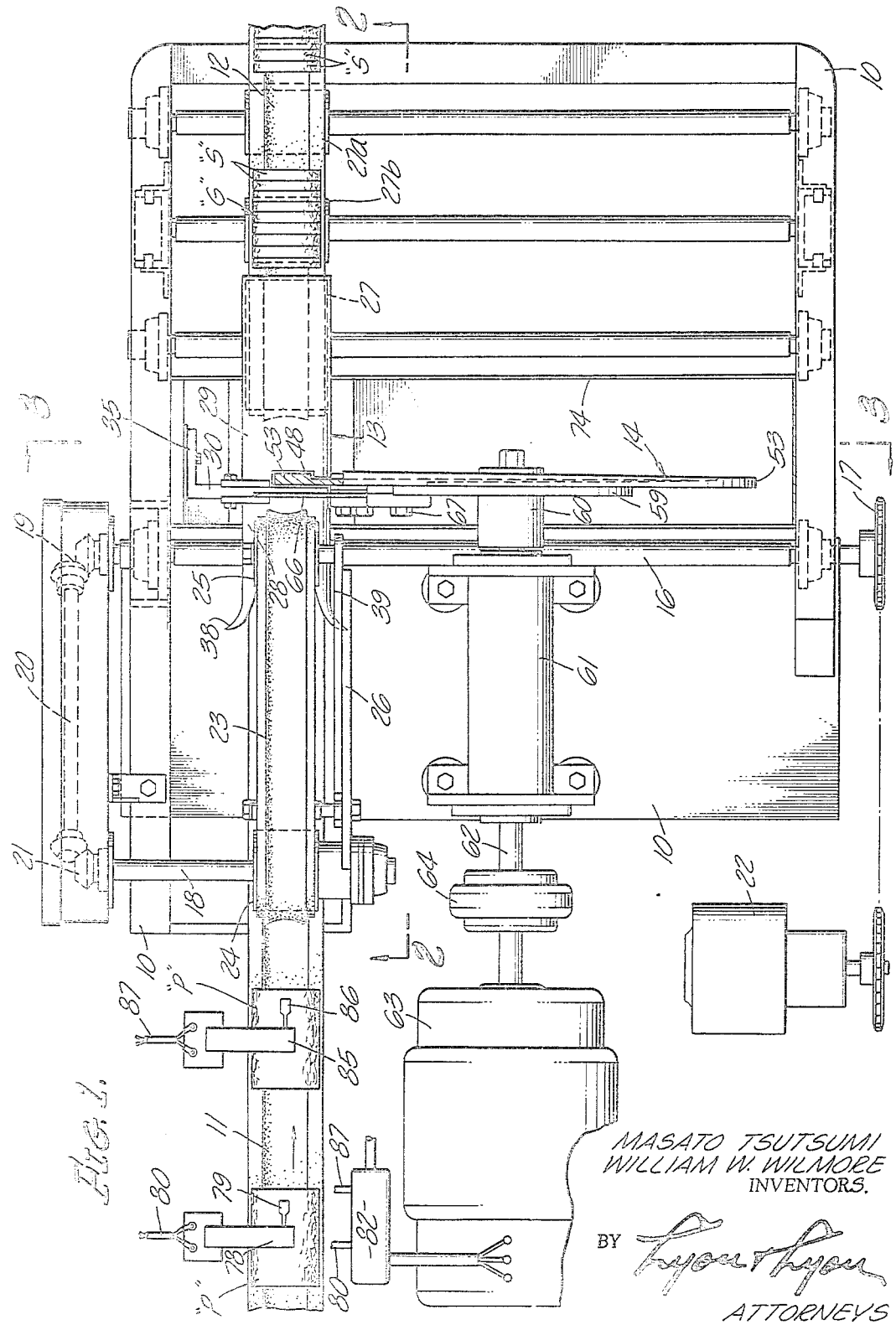
FIGURE 1 is a top plan view partly broken away, showing a preferred embodiment of this invention.
Figure 2:
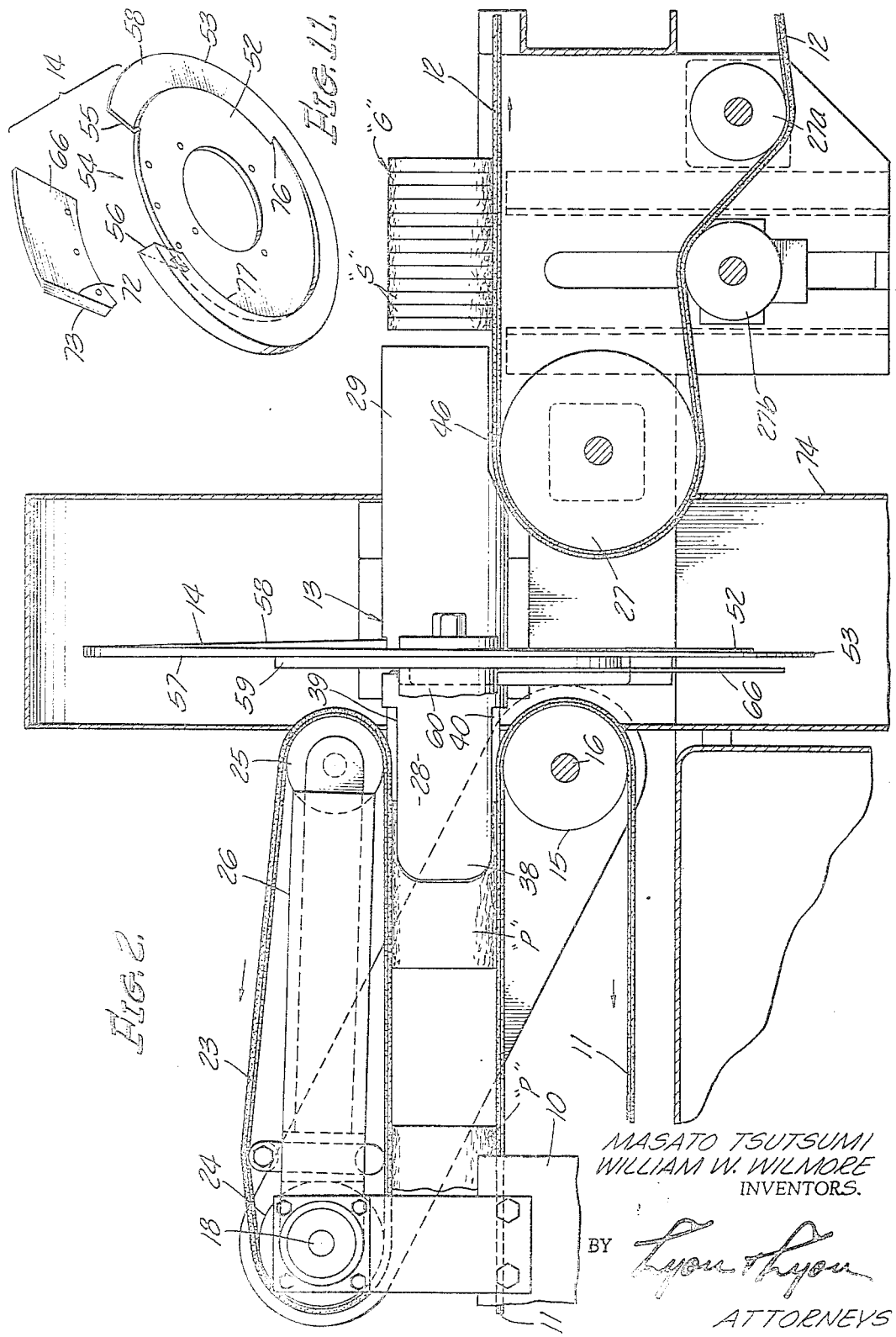
FIGURE 2 is a side elevation taken substantially on the lines 2—2 as shown in FIGURE 1, and also showing the rotary cutter assembly.

Referring to the drawings, a stationary frame 10 supports a feed belt conveyor 11, a discharge belt conveyor 12, a slicer housing generally designated 13, and a rotary cutter assembly 14. The feed belt 11 is driven through pulley 15 fixed on shaft 16 mounted in spaced bearings on the frame and driven by sprocket 17. The shaft 16 also drives the shaft 18 through bevel gears 19, shaft 20 and bevel gears 21. The sprocket 17 is driven from a motor 22. An auxiliary feed belt 23 passes around pulley 24 fixed on shaft 18 and also passes around pulley 25 carried on the arm 26. The pulleys 15 and 24 are the same size and turn at the same speed, with the result that the feed belt 11 and the feed belt 23 travel at the same speed. The discharge conveyor belt 12 passes over pulley 27 and over idler pulleys 27a and 27b, and is driven from a power driven pulley (not shown).

As best shown in FIGURES 4 and 5, the slicer housing generally designated 13 comprises three separate parts: the feed throat member 28, the discharge throat member 29 and the support 30. Member 28 is provided with an end flange 31, member 29 is provided with an end flange 32, and clamp bolts 33 and 34 serve to clamp the support 30 between these end flanges. The support 30 has an angle portion 35 (FIGURE 1) removably mounted on the frame 10. This part 30 forms the sole support for the members 28 and 29 on the frame 10.

The feed throat member 28 is provided with a central axial cylindrical bore 37 having a tapering entrance opening 38. The cylindrical bore 37 and the entrance opening 38 are both interrupted by an upper slot 39 extending through the wall of the member 28, and also interrupted by a lower slot 40 of the same size and shape. The lower reach of the upper feed belt 23 extends into the upper slot 39 and the upper reach of the lower feed belt 11 extends into the lower slot 40. The diameter of the cylindrical bore 37 is the same as the outer diameter of the sized pineapple cylinders P which are carried on the feed belt 11 from the Ginaca machine (not shown) and delivered into the feed throat member 28.

The support 30 has a cylindrical bore 42 which is the same diameter as the bore 37 and is coaxial therewith. The discharge throat member 29 has a cylindrical bore 43 which is the same size and is coaxial with the bores 37 and 42. A tapered bore 44 in the member 29 joins the cylindrical bore 43 with the cylindrical bore 45 which is slightly smaller in diameter than the cylindrical bore 43. The difference in diameter is exaggerated in the drawings for clarity of illustration. A slot 46 is formed in the member 29 in the lower portion of the wall thereof and the discharge belt 12 extends into this slot 46. Each of the belts 11, 12 and 23 is contoured on its working face to fit the outer surface of the pineapple cylinders or slices. A side-opening shallow slot 47 is formed in the member 29 at the end thereof adjacent the support 30, and this slot 47 intersects the curved slots 48 and 49 formed in the upper portion and lower portion, respectively, of the wall of the member 29. The support 30 is cut away on one side to define with the end of the member 28 another side-opening slot 51.

The rotary cutter assembly generally designated 14 includes an annular plate 52 provided with an integral rim 53 which extends for more than 270° around the plate 52 but which has a gap 54 defined between adjacent ends 55 and 56 of the rim 53. The rim 53 serves as a gage plate and has a forward surface 57 which lies in a plane normal to the rotary axis of the assembly 14 and normal to the coincident axes of the cylindrical bores of the throat members 28 and 29. The annular plate 52 extends through the side-opening slot 47, and the rim 53 operates in the clearance slots 48 and 49 formed in the member 29. The thickness of the rim 53 is not uniform; on the contrary it varies in a continuous fashion from a relatively thin leading edge 55 to a relatively thick trailing edge 56. The leading edge 55 is thinner than the thickness of the annular plate 52, and the trailing edge 56 is thicker than the annular plate 52. The rear face 58 of the rim 53 is referred to below as a cam surface. The annular plate 52 is bolted to the end flange 59 of a rotary member 60 supported by bearings within a housing 61 fixed to the frame 10. The member 60 is rotated by a shaft 62 driven by a variable speed motor 63 and flexible coupling 64.

An arcuate knife blade 66 is carried on the rotary cutter assembly 14 and is positioned to travel through the side-opening slot 51 defined between the support 30 and the end of the feed throat member 28. The blade 66 is secured to the annular plate 52 by bolts 67 which are threaded into a backup plate 68. Shims 69 and 70 clamped between the annular plate 52 and the knife 66 positioned the knife at the desired spacing from the gage plate surface 57. These shims determine the thickness of the slice. The knife 66 is positioned adjacent the gap 54 between the ends 55 and 56 of the rim 53, but is laterally offset by means of the spacers and shims 69 and 70. The front face of the knife 66 adjacent the feed throat 28 lies in a plane parallel to the plane of the gage plate surface 57, and the back face of the leading portion of the knife 66 is beveled at 72 to provide a cutting edge 73 in the plane of the front face of the knife 66. The backup plate 68 may be proportioned to serve as a balancing counterweight for the rotary cutter assembly 14. It will be observed in FIGURE 5 that the cutting edge 73 of the plate 66 is positioned approximately at the same angular location as the thick end 56 of the gage plate 53, but laterally offset therefrom.

An enclosure 74 including a hinged cover 75 is mounted on the frame 10 to exclude foreign matter and to retain juice produced by the slicing operation.

In operation, sized and cored pineapple cylinders P are conveyed by feed belt 11 from a Ginaca machine, not shown. When a sized pineapple cylinder P is fed endwise into the feed throat member 28 by means of the belts 11 and 23, it contacts the plane surface 57 of the rotating gage plate 53. The outer diameter of the forward end of the sized pineapple cylinder P is then supported in the cylindrical bore 37 of the member 28 and the cylindrical bore 42 in the support 30. The sharp cutting edge 73 of the knife 66 then enters the side-opening slot 51. The parts are then in the position shown in FIGURES 4, 5 and 6. As the rotary cutter assembly 14 continues to turn, the knife severs a slice S from the cylinder P and this slice moves laterally to the right, as viewed in FIGURES 4 and 5, by reason of the tapered knife surface 72 and the thickness of the blade 66. The slice S moves into the bore 43 in the discharge throat member 29 while the knife 66 is passing through the slot 51.

Figure 3:
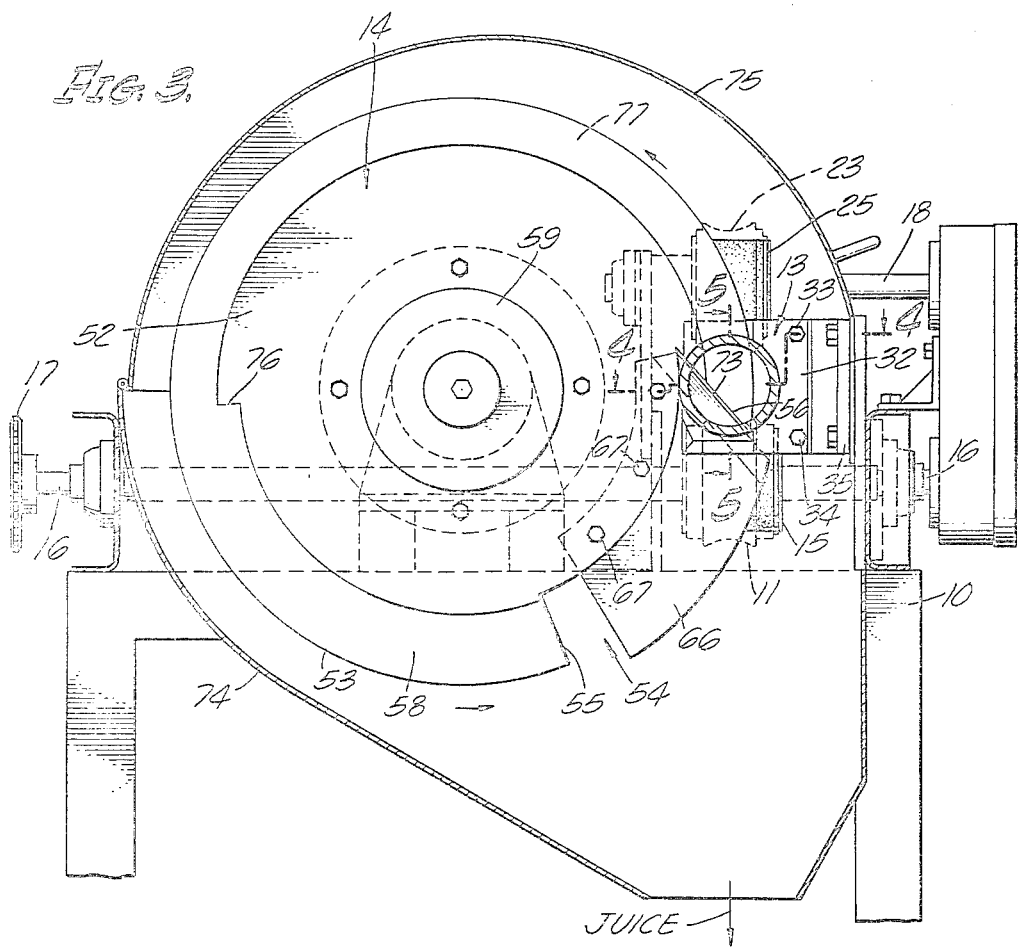
FIGURE 3 is an end elevation taken substantially on the lines 3—3 as shown in FIGURE 1.
Figure 10:
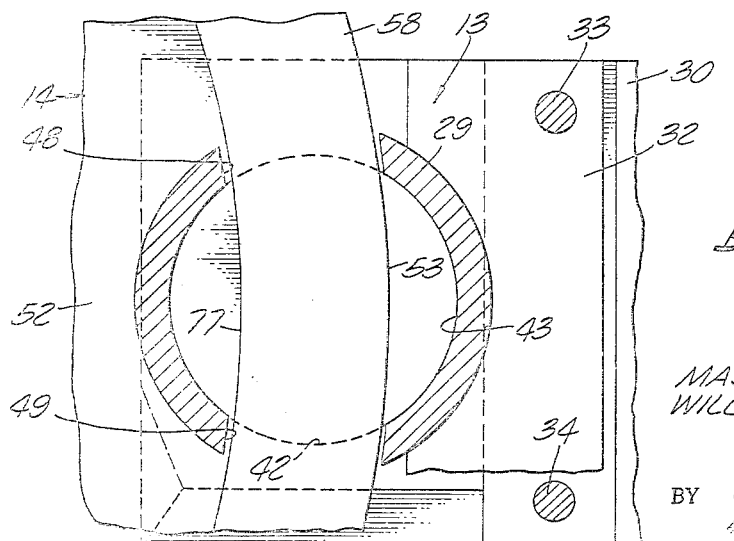
FIGURE 10 is an end elevation taken substantially on the lines 10—10 as shown in FIGURE 9.

FIGURES 6 and 7 show the position of the parts as the trailing end of the knife 66 moves upward out of the slot 51. The thin end 55 of the rotating gage plate 53 follows the knife 66 to enter the side-opening slot 47 in the member 29. It will be observed in FIGURE 3 that the leading end 55 of the rim 53 has a greater radial dimension than the trailing end 56 and that the change in radial width occurs at 76 where the thickness of the rim 53 is equal to the thickness of the annular plate 52. The portion of the rim 53 which is thicker than the gage plate 52 is designated 77 and it is this portion of the rim and cam surface 58 which passes through the clearance slots 49 and 48 in the discharge throat member 29.

When the thin leading end 55 of the gage plate 52 enters the side-opening slot 47, the slice S has moved to the right as shown in FIGURE 8, so that the cam surface 58 contacts the left face of the slice and moves it laterally to the right with considerable force. The reduced diameter of the bore 45 causes the slice to remain normal to the bore axis, and prevents tilting. The slice travels through the taper bore 44 and into the restricted bore 45. While the sloping cam surface 58 is accelerating the slice S for travel into the taper bore 44 and restricted bore 45, the front surface 57 of the gage plate is again contacted by the end of the sized pineapple cylinder P, and another slice is cut when the sharp leading edge 73 of the knife 66 again enters the side-opening slot 51. Each of the slices S (except for the first and last cut from each cylinder P) has exactly the same thickness, so long as the pineapple fruit remains uniform and so long as some pressure is applied against the gage plate surface 57.

The sensor 78 having a fruit-engaging pad 79 determines the presence of fruit cylinders P on the feed belt 11, and acts through electrical connections 80 and suitable electrical mechanism 82 to regulate the rotary knife speed by regulating the speed of drive of the motor 63. Feed belts 11 and 23 normally run faster than the displacement of pineapple through the slicer housing 13. Controlling the speed of the slicer knife assembly 14 assures continuity of operation and maintains a fairly constant end pressure against the gage plate surface 57.

Succeeding slices entering the discharge throat member 29 push the preceding slices ahead and through the restricted bore 45. When the slices S reach the location of the slot 46, they are contacted by the upper surface of the discharge belt 12 and are moved out of the discharge throat 29 in groups G corresponding to the lengths of the sized pineapple cylinders P delivered to the feed throat member 28. The groups of slices emerge from the discharge throat 29 in parallel upright position, each slice contacting the next and without slanting or tilting of any of the slices. This facilitates inspection and permits the ready removal of any substandard slices, such as end slices which may be blemished or which may not be of full thickness. These groups G of upright slices S in contact with each other proceed to can loader apparatus with a minimum requirement of manual handling.

As pointed out above, the first sensor 78 regulates the speed of the motor 63 which drives the rotary cutter assembly 14. The second sensor 85 having a fruit engaging pad 86 functions as an on-off switch and is connected to the electrical mechanism 82 through electrical connections 87. The absence of fruit at this location of the second sensor 85 stops the motor 63, thereby stopping the rotary cutter assembly 14. This assures that the fruit against the gage plate surface 57 always has pressure on it. Presence of fruit at sensor 85 operates through a preset time delay to start motor 63. If the supply of sliced pineapple cylinders P should be interrupted, cut slices S will remain within the discharge throat 29 in advance of the position where the lower portions thereof extend through the slot 46 for contact with the discharge belt 12.

The motor 22 driving the feed belts 11 and 23 is a constant speed motor running at all times. In the operation of this system, the first sensor 78 which regulates the speed of the rotary cutter assembly 14 smooths out the fluctuations of flow of fruit cylinders P. Since the feed belts 11 and 23 run faster than the displacement of fruit through the slicer housing 13, a solid stream of fruit cylinders presses against the gage plate surface 57. If the supply of fruit cylinders passes the second sensor 85, the rotary cutter assembly 14 stops turning, thereby maintaining a predetermined length of fruit cylinders P still pressing against the now stationary gage plate surface 57. Softness of fruit and/or the difference of the amount of pressure created by the normal amount of fruit against the gage plate surface 57 do not appreciably change the thickness of the individual slices S. Also, the pineapple slices are discharged out of the restricted throat onto the faster moving discharge belt 12 as individual cylinders because the ends of the individual cylinders have rough end cuts and do not readily stick together, whereas the slices S cut by the rotary knife are sharp, straight, clean and stick to each other.

As the sized pineapple cylinder P continues to move intermittently into contact with the rotating gage plate surface 57, and as slices are cut and delivered into the discharge throat 29, previously cut slices are moved out of the member 29 on the discharge belt 12. In this way, a group G of slices S emerges from the discharge throat member 29 on the belt 12 each time a sized pineapple cylinder P enters the feed throat member 28.

Having fully described our invention, it is to be understood that we are not to be limited to the details herein set forth, but that our invention is of the full scope of the appended claims.

We claim:

1. Apparatus for slicing sized pineapple cylinders, comprising in combination: a slicer housing for axial sliding reception of the cylinders, the housing having transverse slots therein and having internal portions on both sides of said slots for lateral support of a cylinder, a rotary cutter assembly having a peripheral gage plate extending into one of the housing slots and provided with a surface for contact with the end of a cylinder, and a knife fixed to the gage plate and parallel to and offset from said surface and movable through another housing slot to sever a single slice from the end of the cylinder.

2. The combination set forth in claim 1 in which feed means are provided for moving sized pineapple cylinders axially into said slicer housing.

3. Apparatus for slicing sized pineapple cylinders, comprising in combination: a slicer housing for axial sliding reception of the cylinders, the housing having transverse slots therein and having internal portions on both sides of said slots for lateral support of a cylinder, a rotary cutter assembly having a peripheral gage plate extending into one of the housing slots and provided with a plane surface for contact with the end of a cylinder and extending for an arcuate distance less than 360°; and a knife fixed to the gage plate and parallel to and offset from said plane surface and movable through another housing slot to sever a single slice from the end of the cylinder.

4. The combination set forth in claim 3 in which the said peripheral portion includes a cam surface for moving cut slices in said slicer housing away from the cylinder.

5. A rotary cutter assembly for slicing sized pineapple cylinders, comprising a rotary gage plate and a knife, the gage plate having a front arcuate surface, the knife having a cutting edge spaced laterally from said surface, means for releasably securing the knife to the gage plate at a location near the ends of said arcuate surface, the gage plate having a rear cam surface for moving slices severed by the knife in lateral direction away from said knife.

6. A rotary cutter assembly for slicing sized pineapple cylinders, comprising a gage plate and a knife adapted to rotate about an axis, the gage plate having a front arcuate surface lying in a plane normal to said axis, the knife having a cutting edge lying in a parallel plane axially spaced therefrom, means for releasably securing the knife to the gage plate at a location near the ends of said arcuate surface, the gage plate having a rear cam surface for moving slices severed by the knife in a direction parallel to said axis.

7. The device of claim 6 in which the arcuate surface extends for more than 270° with a gap between adjacent ends thereof, and wherein the knife is positioned adjacent the gap.

8. The device of claim 6 in which a removable spacer is interposed between the knife and the gage plate to control the thickness of the cut slice.

9. Apparatus for slicing sized pineapple cylinders, comprising in combination: a first stationary member having a feed throat for sliding reception of said cylinders, a second stationary member having a discharge throat, said discharge throat being aligned with said feed throat, a support interposed between adjacent ends of said members, and defining a pair of lateral slots, one on each side of the support, a rotary cutter assembly mounted to turn about an axis parallel to said aligned throats, said assembly including a gage plate and a knife, the gage plate having a contact surface lying in a plane normal to said axis, the knife having a cutting edge lying in a parallel plane axially spaced therefrom, the knife passing through one of the slots and the gage plate passing through the other of said slots, conveyor means for delivering sized pineapple cylinders end-to-end into said feed throat to contact said surface of the rotating gage plate until a slice is severed by said knife from a cylinder, the gage plate having a rear cam surface for crowding the severed slice into said discharge throat.

10. A rotary cutter assembly for slicing sized pineapple cylinders, comprising: a gage plate adapted to rotate about an axis, the gage plate having a front arcuate surface lying in a plane normal to said axis and extending more than 270° with a gap between adjacent ends thereof, a knife having a cutting edge lying in a parallel plane axially spaced therefrom, means for releasably securing the knife to the gage plate adjacent said gap, the gage plate having a rear cam surface for moving slices severed by the knife in a direction parallel to said axis, said cam surface being interrupted by the same gap, the axial distance separating the rear cam surface from the front arcuate surface being least at one end of the gap and greatest at the other end of the gap.

11. Apparatus for slicing sized pineapple cylinders, comprising in combination: means providing a feed throat for sliding reception of said cylinders, means providing a discharge throat aligned with said feed throat, a rotary cutter assembly mounted to turn about an axis parallel to said aligned throats, said assembly including a gage plate and a knife, the gage plate having a contact surface lying in a plane normal to said axis, the knife having a cutting edge lying in a parallel plane axially spaced therefrom, the knife and gage plate surface passing between said feed throat and said discharge throat, conveyor means for delivering sized pineapple cylinders end-to-end into said feed throat to contact said surface of the rotating gage plate until a slice is severed by said knife from a cylinder, the gage plate having a rear cam surface for crowding the severed slice into said discharge throat.

12. Apparatus for slicing sized pineapple cylinders, comprising in combination: a first stationary member having a feed throat for sliding reception of said cylinders, a second stationary member having a discharge throat, said discharge throat being aligned with said feed throat and having a tapered section therein leading to a restricted bore, a rotary cutter assembly mounted to turn about an axis parallel to said aligned throats, said assembly including a gage plate and a knife, the gage plate having an arcuate contact surface lying in a plane normal to said axis, the knife having a cutting edge lying in a parallel plane axially spaced therefrom, the knife and gage plate surface passing between said first and second members, conveyor means for delivering sized pineapple cylinders end-to-end into said feed throat to contact said surface of the rotating gage plate until a slice is severed by said knife from a cylinder, the gage plate having a rear cam surface for crowding the severed slice into said taper section of said discharge throat and into said restricted bore, and conveyor means for carrying the cut slices from said second member.

13. Apparatus for slicing sized pineapple cylinders, comprising in combination: a gage plate, feed means for advancing a cylinder axially into end contact with the gage plate, a knife offset laterally from and parallel to the gage plate and movable to sever a single slice from the end of the cylinder, means for sensing the presence or absence of the pineapple fruit, and means responsive to the sensing means for varying the speed of motion of said knife.

14. Apparatus for slicing sized pineapple cylinders, comprising in combination: a gage plate, feed means for advancing a cylinder axially into end contact with the gage plate, a knife offset laterally from and parallel to the gage plate and movable to sever a single slice from the end of the cylinder, means engageable with the cylinder for sensing the presence or absence of the pineapple fruit, and means responsive to the sensing means for varying the speed of motion of said knife.

15. The combination set forth in claim 14 in which the gage plate and the knife are secured together and rotate as a unit.

16. The combination set forth in claim 14 in which the feed means comprises a continuously moving conveyor belt.

17. The combination set forth in claim 16 including additional sensing means for detecting the absence of a cylinder on the conveyor belt to stop the motion of said knife.

References Cited

UNITED STATES PATENTS

| | | | |
|---|---|---|---|
| 1,973,526 | 9/1934 | Diamond et al. | 146—95 |
| 1,974,602 | 9/1934 | Dziedzic | 146—95 |
| 3,136,348 | 6/1964 | Farmer | 146—6 |

W. GRAYDON ABERCROMBIE, Primary Examiner

U.S. Cl. X.R.

146—95